United States Patent [19]

Gill et al.

[11] Patent Number: 5,666,246
[45] Date of Patent: Sep. 9, 1997

[54] MAGNETIC STORAGE SYSTEM WITH CANTED HARDBIAS MAGNETORESISTIVE HEAD

[75] Inventors: Hardayal Singh Gill, Portola Valley; David Eugene Heim, Redwood City, both of Calif.

[73] Assignee: International Business Machines Corporation, Armonk, N.Y.

[21] Appl. No.: 435,008

[22] Filed: May 4, 1995

Related U.S. Application Data

[62] Division of Ser. No. 94,828, Jul. 19, 1993, abandoned.

[51] Int. Cl.$^6$ .................................................. G11B 5/127
[52] U.S. Cl. .................................................. 360/113
[58] Field of Search .................... 360/113; 338/32 R; 324/252

[56] References Cited

U.S. PATENT DOCUMENTS

| | | | |
|---|---|---|---|
| 3,840,898 | 10/1974 | Bajorek et al. | 360/113 |
| 3,908,194 | 9/1975 | Romankiw | 29/603 |
| 3,940,797 | 2/1976 | Brock et al. | 360/125 |
| 4,771,349 | 9/1988 | Tsang | 360/113 |
| 5,001,586 | 3/1991 | Aboaf et al. | 360/113 |
| 5,018,037 | 5/1991 | Krounbi et al. | 360/113 |
| 5,206,590 | 4/1993 | Dieny et al. | 360/113 |

OTHER PUBLICATIONS

Mee, C. Denis and Daniel, Eric F., Magnetic Recording Handbook: Technology and Applications, p. 303 1988.

*Primary Examiner*—Robert S. Tupper
*Assistant Examiner*—David D. Davis
*Attorney, Agent, or Firm*—Leslie G. Murray

[57] ABSTRACT

A magnetic storage system in which a magnetoresistive (MR) transducer utilizes a high coercivity magnetic material to produce a bias field for achieving higher signal output with low currents for narrow track width applications. Strips of high coercivity magnetic material contiguously contact opposite track-overlying edges of an MR layer. Each strip has a horizontal component of magnetization times its thickness that is at least equal to a horizontal component of magnetization of the MR layer times its thickness before the MR layer is biased by the strips, and each strip has its magnetization direction canted at an angle φ from its horizontal component. The MR layer is asymmetrically positioned between spaced magnetic shields and the MR layer is separated by a conductive nonmagnetic spacer layer from a shunt layer. Alternatively, the shunt layer is replaced by a reduced thickness soft film layer and the MR layer is centered between the shields and the strips also contiguously contact track overlying edges of the soft film layer.

10 Claims, 4 Drawing Sheets

MAGNETIC STORAGE SYSTEM WITH CANTED HARDBIAS MAGNETORESISTIVE HEAD

This is a divisional of copending application Ser. No. 08/094,828 filed on Jul. 19, 1993 now abandoned.

FIELD OF THE INVENTION

This invention relates to magnetic storage systems, and more particularly to such systems in which a magnetoresistive (MR) head has a bias magnetic field that provides enhanced signal output with low currents for narrow track width applications.

BACKGROUND OF THE INVENTION

In an attempt to improve the sensitivity and linearity of the MR effect, it is known to apply a constant bias magnetic field to an MR head. This field rotates the magnetization of an MR sensor film to a new direction at an angle $\Theta$ with the original orientation direction. This rotation of the magnetization can be achieved in the following ways:

(1) Locate a permanent magnet adjacent the MR sensor film. However, this approach provides linearity only adjacent the top and bottom edges and not over the entire height of the MR sensor film. Moreover, if the permanent magnet is placed directly aver the active area of the MR sensor film, the coercivity of the soft film may be raised to a level that is undesirable far sensor applications.

(2) Position a shunt conductor in contact with the MR sensor film. However, this provides poor sensitivity because the conductive film short circuits the MR film, and thereby removes at least 50% of the signal.

(3) Locate a soft magnetic film adjacent the MR film. This provides good linearity; but it does not provide good sensitivity because the soft film shunts the current away from the MR sensor film and thereby can remove about 30% of the signal.

(4) Asymmetrically position the MR film in the gap between the magnetic shields, with or without a shunt layer contacting tire MR film, as taught in U.S. Pat. No. 3,940, 797. This will not, without the shunt layer, provide a bias field that can achieve an adequate degree of linearization unless current density is increased to a level where power dissipation overheats and destroys the sensor. Moreover, for thin gaps of the order of 2 µm, it is difficult if not impossible to manufacture an MR head that will provide sufficient asymmetry to create a bias magnetic field of meaningful magnitude. This is because the bias field magnitude increases with the degree of asymmetry; and with a ratio of over 3:1, as taught by this cited patent for MR heads without a shunt layer, the MR film would he spaced so close to one of the magnetic shields that electrical shorting would very likely occur.

(5) Create a magnetically biased MR strip by oxidizing portions adjacent each side edge of a Permalloy strip sensor so that they become hard magnets while the unoxidized central portion remains soft, as described in connection with FIG. 4 of U.S. Pat. No. 3,840,898. However, this technique can raise the coercivity of the Permalloy material only about 50–100 Oe. This is insufficient to prevent the oxidized regions from becoming demagnetized near their edges. When this occurs, the magnetization in the oxidized regions will not remain canted and hence not provide the desired bias. Finally, as a result of this oxidation, the magnetization at the oxidized side portions will undesirably be less than that at the central portion.

There is a need for a magnetic storage system having an MR head that has optimal transverse bias and high read efficiency and is especially suitable for narrow track width applications.

SUMMARY OF THE INVENTION

A magnetic storage system is described in which a magnetoresistive (MR) transducer has a bias field produced by a high coercivity magnetic material that provides enhanced signal output with low transducer currents for data track width applications of 2 µm or less.

Strips of high coercivity magnetic material contiguously contact opposite track-overlying edges of an MR layer. Each strip has a horizontal component of magnetization times its thickness that is at least equal to a horizontal component of magnetization of the MR layer times its thickness before the MR layer is biased by the strips, and each strip has its magnetization direction canted at an angle $\phi$ from its horizontal component.

The MR layer is asymmetrically positioned between spaced magnetic shields and the MR layer is separated by a conductive nonmagnetic spacer layer from a shunt layer. Alternatively, the shunt layer is replaced by a reduced thickness soft film layer and the MR layer centered between the shields and the high coercivity strips also contiguously contact track overlying edges of the soft film layer.

In each configuration the strips have a coercivity of at least 500 Oe, and angle $\phi$ is $60°\pm15°$ and the components cooperate to bias the MR layer at an angle $\Theta$ of $40°\pm7°$ from its horizontal component to optimize sensing efficiency of the transducer.

DETAILED OF PREFERRED EMBODIMENTS

Figure 1:
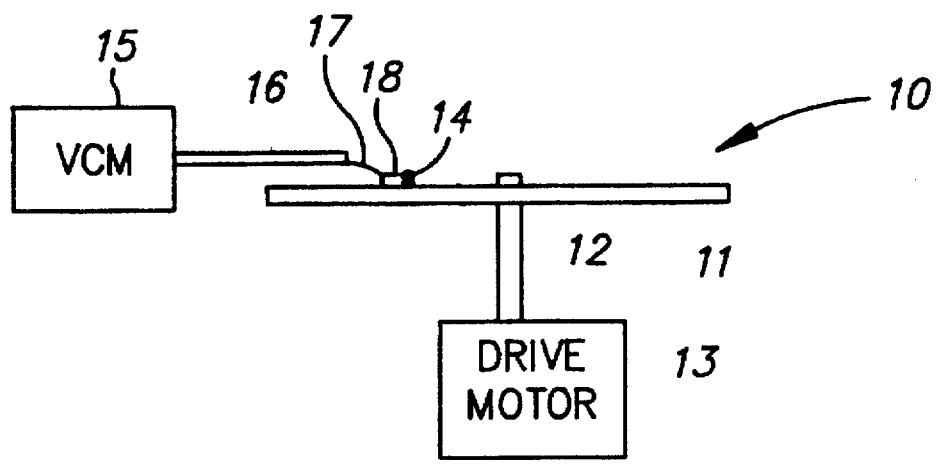
FIG. 1 is a schematic diagram of a magnetic disk storage system embodying the invention.

As illustrated in FIG. 1, a magnetic disk storage system 10 embodying the invention comprises a rotatable magnetic disk 11 supported on a spindle 12 and rotated by a disk drive motor 13. A composite magnetic inductive write/magnetoresistive (MR) read head 14 is movable relative to the disk by an actuator means for writing and reading magnetized data on tracks (not shown) on the disk. As illustrated, the actuator means comprises a voice coil motor 15 that acts through an actuator arm 16, a suspension 17, and a slider 18 to move the head 14 radially of the disk.

Figure 2:
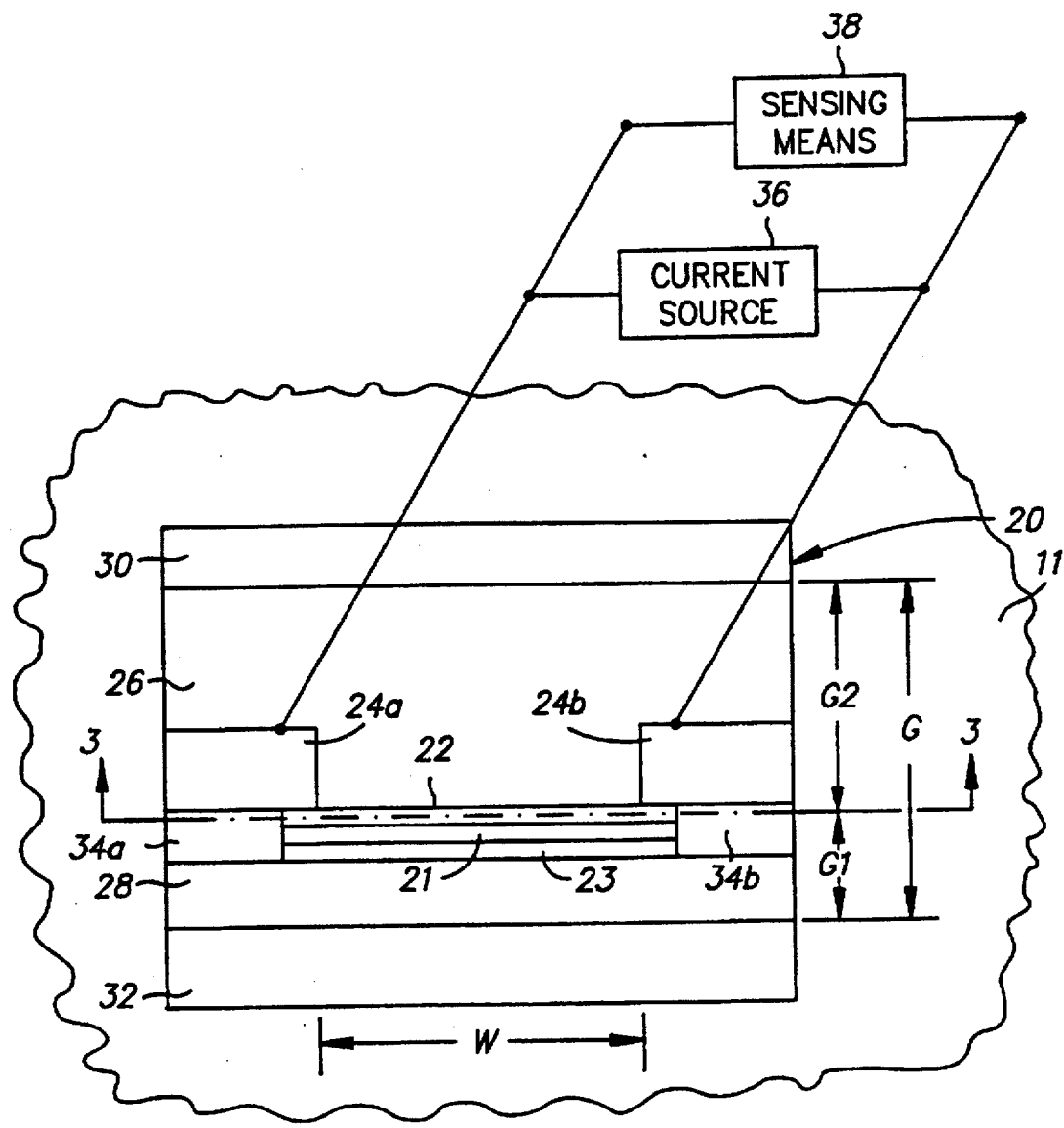
FIG. 2 is a top view of an MR head constructed according to one embodiment of the invention.

According to one embodiment or the invention, and as illustrated in FIG. 2, the composite write/read head 14 comprises an MR read head 20. Head 20 comprises a spacer layer 21 separating an MR sensor film layer 22 from a thin conductive shunt layer 23. Layer 23 is coextensive with the MR layer 22 to generate a bias field intercepting the MR layer when current is supplied to layers 22, 23 via current-carrying conductive leads 24a, 24b that make overlying contact with opposite edge portions or MR layer 22. The facing edges or the leads 24a, 24b are spaced apart a distance corresponding to the width W of a data track on disk 11. The MR layer 22 and shunt layer 23 are separated by layers 26, 28 of insulating material from magnetic shields 30, 32, respectively. MR layer 22 is asymmetrically disposed within a gap G formed between the shields 30, 32 such that gap portion G1 is smaller than the remaining gap portion G2. As illustrated, hard bias layers in the form of strips 34a, 34b of high coercivity magnetic material make contiguous contact with the opposite track-overlying edges of MR layer 22, spacer layer 21 and shunt layer 23 to facilitate fabrication. However, it is only essential to this embodiment that the strips be in contiguous contact with the MR layer 22.

The MR sensor layer 22 may consist of a 100–300 Å thick layer of a magnetically permeable material, such as Permalloy (NiFe); the spacer layer 21 of 50–200 Å of a high resistivity nonmagnetic conductive material, preferably Ta; the shunt layer 23 of 50–200 Å of Ti, Nb, TiZr or Mo; the leads 24a, 24b of 500–2000 Å of Ta with an underlying seed layer of TiW or TaW to reduce the resistivity; the shields 30, 32 of a magnetically permeable material, such as Permalloy; the insulating layers 26, 28 of an electrically insulating material such as $Al_2O_3$; and the hard bias strips 34a, 34b of a hard magnetic (i.e., high coercivity) material such as CoPtCr having a thickness substantially equal to the combined thickness of layers 21, 22, 23.

Spacer layer 21 (i) prevents the undesirable chemical reactions which can occur when a shunt layer is in direct contact with an MR layer; and (ii) acts as a seed layer, especially if of Ta, to provide superior MR material for layer 22.

Current source 36 produces a current flow through the MR head 20 to provide proper biasing and to generate an output voltage signal. Sensing means 38 senses variations in resistivity of the MR head 20 due to differences in rotation of the magnetization M in MR layer 22 as a function of the magnetic field being sensed.

Figure 3:
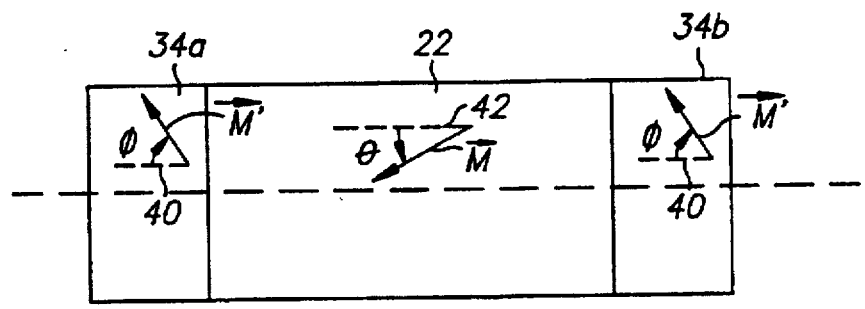
FIG. 3 is a sectional view taken along the line 3—3 of FIG. 2.

Referring now also to FIG. 3, according to features of the invention, strips 34a, 34b should have a coercivity of at least 500 Oe. The canting angle $\phi$ of the magnetization M' of the high coercivity strips 34a, 34b should be in the range of about 60°±15°. Also, as shown in FIG. 3, the horizontal component 40 of magnetization M' of each strip multiplied by its thickness $t_{hb}$ should be at least equal to the horizontal component 42 of magnetization M of MR layer 22 multiplied by its thickness $t_{MR}$ before the MR layer is biased by said strips. These horizontal components 40, 42 are those in a direction parallel to the track width W.

The value of M' may be calculated from the following equation:

$$t_{hb}(M'COS\phi) = t_{MR}(M)$$

Strips 34a, 34b meeting these criteria, when combined with an MR layer 22 having a G1:G2 asymmetry ratio of at least 2:1 have been found to provide an MR layer having an optimum bias angle $\Theta$ in the range of 40°±7°. The asymmetry ratio is limited by the size of the gap G and the fact that the MR layer must be at least 0.05 μm from a shield to insure against electrical shorting. With these criteria satisfied, optimum bias is achieved with higher reading efficiency than encountered in previously proposed configurations employing shunt conductor biasing or soft film biasing.

Figure 4:
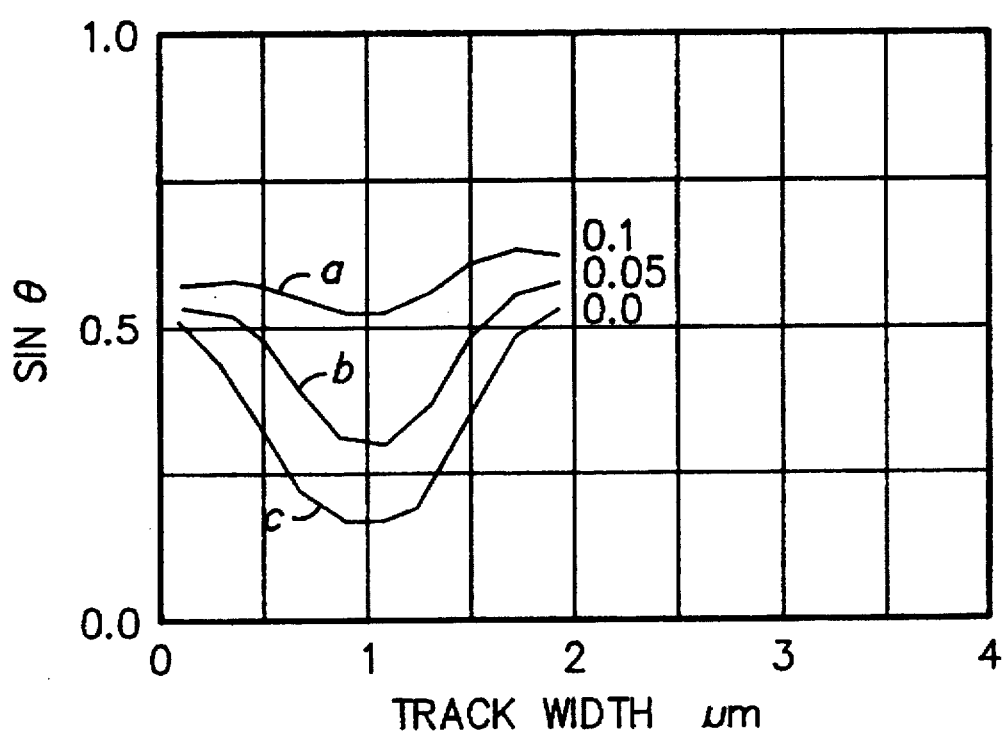
FIG. 4 is a plot showing how the sine of bias angle $\Theta$ varies across the track width of an MR film layer depicted in FIG. 2, at varying amounts of offset of the MR layer between the magnetic shields.

FIG. 4 depicts a plot of actual test results achieved with an MR head 20 having the configuration shown in FIGS. 2 and 3. FIG. 4 shows how the sine of bias angle $\Theta$, as measured at mid-film height of the MR film layer 22, varies across the track-width-overlying portion of the MR layer for different amounts of asymmetry or offset from the center of the gap G between shields 30 and 32. Curve (a) shows that, with a track width W of 2 μm, an MR layer 22 can be adequately biased at an angle $\Theta$ of approximately 37° by employing the canted contiguous hard bias strips 34a, 34b, an asymmetry or offset of 0.1 μm in a gap of 0.55 μm between shields, and a shunt conducting layer 23 having a resistivity of 57 μΩcm. The gaps G1 and G2 were 0.375 μm and 0.175 μm, providing an asymmetry ratio of 2.14. Good output signals were obtained from the MR head with a current of 10 mA. Other parameters were:

$t_{MR}$=250 Å

$t_{SH}$=170 Å

$t_{SP}$=125 Å

$H_k(MR)$=4 Oe $H_k(SH)$=4 Oe $4\pi M_s(MR/SH) = 10^4/8.2\times10^3$ emu/cc

H×W=2.0×2.0 μm

Hard bias:
  $M_s$=700 emu/cc
  $t_{HB}$=594 Å
  $\phi_{HB}$=67°

$\rho(MR/SP/SH)$=27/190/57 μΩcm $\Omega/\square$=0.925 (Lead)

where $t_{SH}$=thickness of shunt layer 23, and H and W are the height and width of MR layer 22.

Curve (b) shows the bias angle $\Theta$ with an offset of 0.05 μm and hence an asymmetry ratio of 1.44; and curve (c) shows the bias angle $\Theta$ with no offset. These curves indicate that, due to the reduced bias angle, higher currents are required to obtain output signals of comparable amplitude and minimum signal waveform asymmetry. Also, tests conducted employing asymmetric offset without the canting of the hard bias material showed that higher currents, of the order of 20 mA, were required to provide an appropriate output signal.

Figure 5:
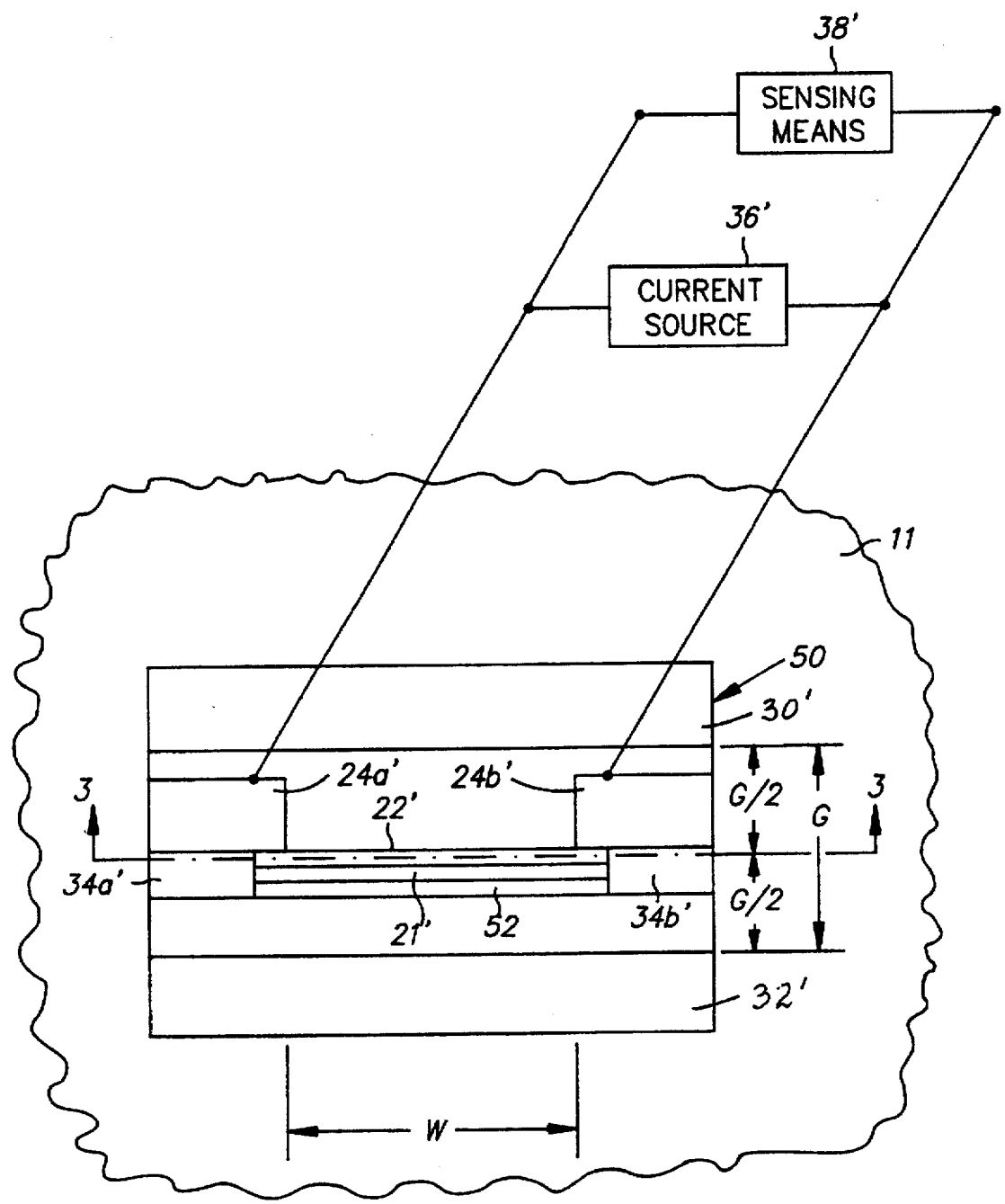
FIG. 5 is a top view of an MR head according to a modified embodiment of the invention.

FIG. 5 illustrates an MR read head 50 according to a modified embodiment of the invention. In FIG. 5, like reference numerals but primed have been used to identify components which may be identical with those depicted in FIG. 2. As illustrated in FIG. 5, MR head 50 differs from the MR head 20 depicted in FIG. 2 in that the MR layer 22' is centered at equal distances G/2 from each shield 30', 32' (rather than asymmetrically within gap G), and shunt layer 23' is replaced by a soft magnetic film layer 52 of such as NiFeRh or NiFeCr having a thickness approximately one-quarter that of MR layer 22'. The high coercivity strips 34a', 34b' make contiguous contact with opposite track-overlying edges of MR layer 22', spacer layer 21', and soft film layer 52. Like shown in FIG. 3, each of the high coercivity strips 34a', 34b' has its magnetization direction canted at an angle $\phi$; and the horizontal component 40 of magnetization M' of each strip times its thickness $t_{hb}$ must be at least equal to the horizontal component 42 of magnetization M of MR layer 22' times its thickness $t_{MR}$ plus the horizontal component of magnetization of the soft film layer 52 times its thickness $t_{SF}$ before the MR layer is biased by strips 34a', 34b'. Except as hereinafter noted, the thicknesses, composition, canting angle $\phi$, and optimum bias angle $\Theta$ should be within the same ranges as specified for like numbered components in the embodiment of FIG. 2.

Use of the canted contiguous hard biased strips 34a, 34b enables optimum bias to be achieved with a soft film bias layer 52 having a thickness that does not exceed 30% of the thickness of the MR layer 22'. This provides a soft film layer 52 with a thickness that is approximately one-third that required without applicants' canted contiguous hard bias configuration. This reduction in soft film thickness has been found by actual test to provide a gain in read signal of 30%–50%.

Figure 6:
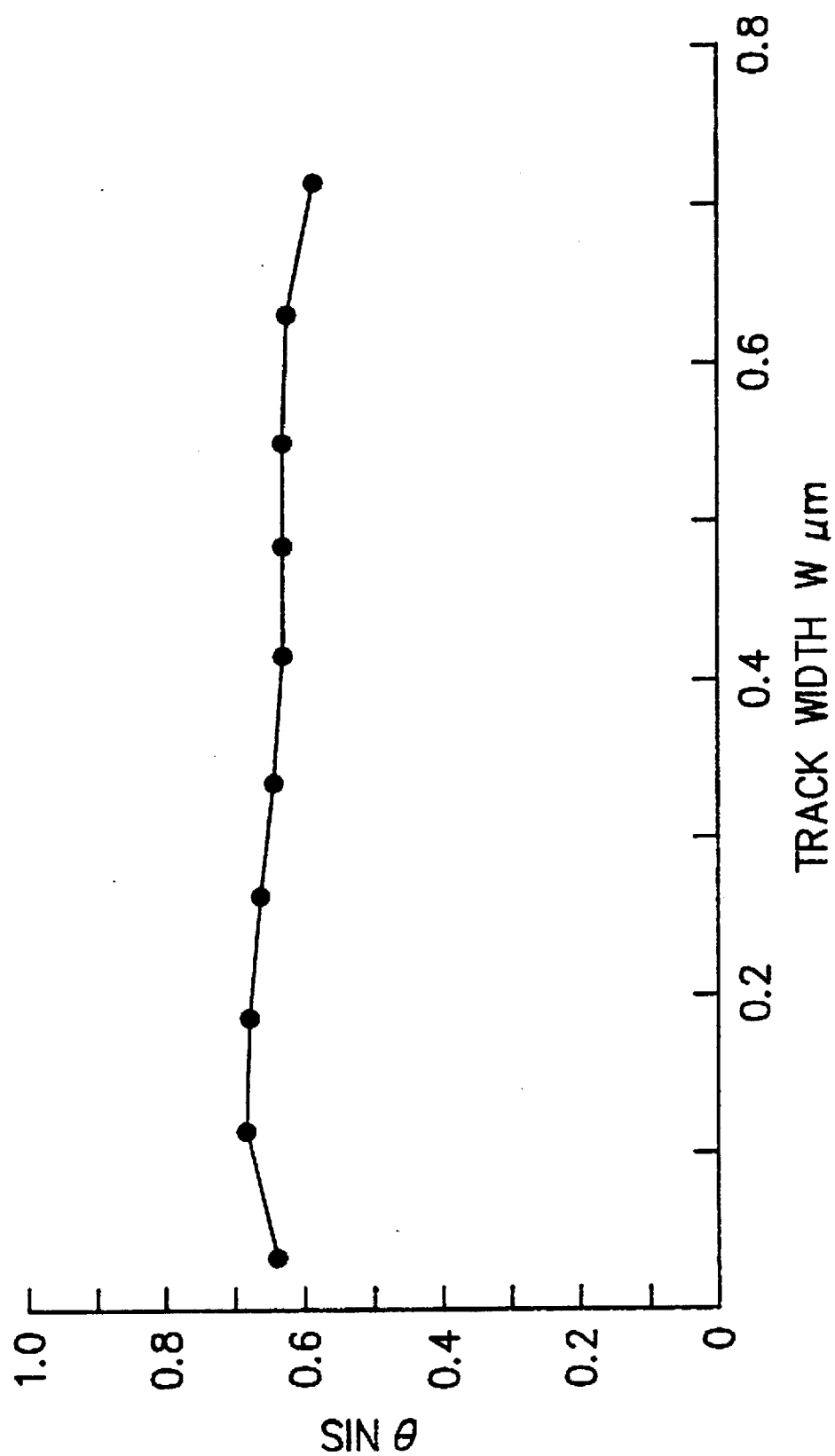
FIG. 6 is a plot of the sine of bias angle $\Theta$ across the track width of an MR layer depicted in FIG. 5, with the MR layer centered between the magnetic shields.

FIG. 6 depicts a plot of actual test results achieved with an MR head 50 having the configuration shown in FIG. 5.

This test showed that, with a track width of only 0.75 µm, MR layer 22' can be adequately biased at an angle Θ of approximately 41° by employing the canted contiguous hard bias strips 34a', 34b' in combination with the soft film layer 52, and centering the MR layer between the shields 30', 32'. Good output signals were obtained from the MR head 50 with a current of 10 mA. Other parameters were:

$t_{MR}$=200 Å

$t_{SP}$=50 Å

$t_{SF}$=50 Å

$G_{total}$=0.40 µm

MR layer height H=1.0 µm

Track width W=0.75 µm $4\pi M_s$(MR/SF)=$10^4$/8.2×$10^3$ emu/cc p(MR/SP/SF)=27/190/57 µΩ-cm For both strips 34a', 34b':

$t_{HB}$=500 Å

$B_R^{UB}$=1.00×$10^4$G $\phi_{HB}$=72°

It should be noted that the soft film bias layer 52 is only 50 Å thick, one-third the normal 150 Å thickness required in soft film biased MR heads described in prior art known to applicants. This one-third reduction in thickness of soft bias layer 52 desirably reduces the amount of space it requires in the gap G, and results in a three-fold increase in its resistivity which provides a stronger output voltage signal. This embodiment is preferred for track widths of 1 µm or less. Also, for this embodiment, the strips 34a', 34b' should make contiguous contact with the soft film bias layer 52 as well as with the MR layer 22' (and incidentally with the spacer layer 23' for ease in fabrication) to insure magnetic stability of the soft film so it will stay in a single domain state.

The magnetization direction of the high coercivity material in strips 34a, 34b can be canted during magnetic initialization of the MR head or during fabrication of the MR head, as is known in the art.

It is to be noted that the invention may, if desired, be effectively applied to magnetic tape storage systems and magneto-optical storage systems.

While the invention has been shown and described with respect to preferred embodiments thereof implemented in a magnetic disk storage system, it will be understood by those skilled in the art that changes in form and detail may be made without departing from the scope and teaching of the invention. Accordingly, the magnetic disk storage system and MR read transducer herein disclosed are to be considered merely as illustrative, and the invention is to be limited only as specified in the claims.

We claim:

1. A shielded magnetoresistive (MR) transducer for sensing magnetized data from a data track on a magnetic storage medium, comprising:

an MR layer;

a shunt layer coextensive with the MR layer for generating a first magnetic bias field intercepting the MR layer;

a pair of spaced shields of magnetically permeable material, said MR layer being disposed between said pair of shields and positioned closer to one of the shields than to the other of the shields; and strips of high coercivity magnetic material in contiguous contact with opposite data track-overlaying edges of said MR layer for providing a second magnetic bias field in said MR layer, each of said strips having its magnetization direction canted at an angle ϕ from a horizontal component of its magnetization, the angle ϕ being in a range of about 45° to 75°, said canted magnetic bias field provided by said strips cooperating with said first bias field generated by said shunt layer and said placement of the MR layer between the shields to magnetically bias the MR layer with its magnetic bias field at an angle Θ from a horizontal component of its bias field, the angle Θ being in a range of about 33° to 47°.

2. The transducer of claim 1 wherein each of said strips has a horizontal component of magnetization times its thickness that is at least equal to a horizontal component of magnetization of said MR layer times its thickness before the MR layer is biased by said strips.

3. The transducer of claim 17 wherein said strips have a coercivity of at least 500 Oe.

4. A magnetoresistive (MR) sensing system, comprising, in combination with the transducer assembly of claim 2:

a pair of conductive leads, each in overlying contact with a respective track-overlying-end portion of the MR layer;

a current source for producing a current flow through the MR layer and shunt layer to provide a bias and an output signal; and sensing means for sensing variations in resistivity of the MR transducer assembly due to differences in rotation of the magnetization direction of the MR layer.

5. The transducer of claim 1 wherein the placement of the MR layer with respect to said one of the shields provides an asymmetry ratio of at least 2:1.

6. The transducer of claim 1 wherein said strips have a coercivity of at least 500 Oe.

7. A shielded magnetic storage system comprising:

a magnetic storage medium having a plurality of tracks with magnetized data recorded thereon; and a magnetoresistive (MR) transducer for sensing the data, said transducer comprising bias strips of high coercivity material in contiguous contact with track-overlaying edges of an MR layer for providing a first magnetic bias field in said MR layer, said MR layer being (i) asymmetrically positioned within a gap between spaced magnetic shields, and (ii) separated by a high resistivity nonmagnetic metallic spacer layer from a shunt layer, said shunt layer for providing a second magnetic bias field intercepting the MR layer, each of said bias strips having its magnetization direction canted at an angle ϕ from a horizontal component of its magnetization, the angle ϕ being in a range of about 45° to 75°, said canted magnetic bias field provided by said bias strips cooperating with said second magnetic bias field provided by said shunt layer and said MR layer asymmetry to bias the MR layer with its magnetization direction canted from a horizontal component of its magnetization at an angle Θ preselected to optimize sensing efficiency of the transducer, the angle Θ being in a range of about 33° to 47°.

8. The system of claim 7, wherein the tracks of said storage medium have a width of approximately 2 µm.

9. The shielded transducer of claim 7 wherein each of said bias strips has a horizontal component of magnetization times its thickness that is at least equal to a horizontal component of magnetization of said MR layer times its thickness before the MR layer is biased by said bias strips.

10. The system of claim 9 wherein said bias strips have a coercivity of at least 500 Oe.

* * * * *

UNITED STATES PATENT AND TRADEMARK OFFICE
CERTIFICATE OF CORRECTION

PATENT NO. : 5,666,246
DATED : Sep. 9, 1997
INVENTOR(S) : Gill et al.

It is certified that error appears in the above-indentified patent and that said Letters Patent is hereby corrected as shown below:

Claim 3 line 14, delete "17" and insert --2--

Signed and Sealed this

Fifth Day of January, 1999

Attest:

Attesting Officer

*Acting Commissioner of Patents and Trademarks*